(12) United States Patent
Ioffe

(10) Patent No.: US 8,532,382 B1
(45) Date of Patent: *Sep. 10, 2013

(54) FULL-LENGTH VIDEO FINGERPRINTING

(75) Inventor: Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/529,841

(22) Filed: Jun. 21, 2012

Related U.S. Application Data

(63) Continuation of application No. 12/536,907, filed on Aug. 6, 2009, now Pat. No. 8,229,219.

(51) Int. Cl.
*G06K 9/00* (2006.01)

(52) U.S. Cl.
USPC .......................................................... 382/168

(58) Field of Classification Search
USPC ................. 382/168, 170, 100, 232–253, 305, 382/209, 224–225; 375/240.01–240.29; 345/473; 715/723; 707/694, 722, 758
See application file for complete search history.

(56) References Cited

U.S. PATENT DOCUMENTS

| | | | |
|---|---|---|---|
| 7,991,206 B1* | 8/2011 | Kaminski, Jr. | 382/124 |
| 7,991,770 B2* | 8/2011 | Covell et al. | 707/722 |
| 8,010,511 B2* | 8/2011 | Brock et al. | 707/694 |
| 8,156,132 B1* | 4/2012 | Kaminski, Jr. | 707/758 |
| 2009/0052784 A1* | 2/2009 | Covell et al. | 382/209 |
| 2011/0273455 A1* | 11/2011 | Powar et al. | 345/473 |

* cited by examiner

*Primary Examiner* — Ishrat I Sherali
(74) *Attorney, Agent, or Firm* — Fenwick & West LLP

(57) ABSTRACT

A full-length fingerprint is generated for a video that represents characteristics of the entire duration of the video in a small amount of data. A plurality of subfingerprints for the video, each subfingerprint encoding features of a corresponding segment of the video, is accessed. A plurality of subhistograms is generated for the video, each subhistogram encoding a frequency of subfingerprint features for subfingerprints included in a subset of the plurality of accessed subfingerprints. A master histogram for the video is generated that encodes a frequency of subhistogram features for the plurality of generated subhistograms for the video. A hashing procedure is applied to the master histogram to produce the full-length fingerprint. Clustering can be performed on full-length video fingerprints for videos in a database to detect near-duplicate videos.

28 Claims, 11 Drawing Sheets

First Fingerprint 450a  { [ (B3, 1) (A2, 2) (K12, 3) (G7,4) ]

Second Fingerprint 450b  { [ (J13, 1) (A2, 2) (K12, 3) (L32,4) ]

FULL-LENGTH VIDEO FINGERPRINTING

RELATED APPLICATIONS

This application is a continuation of U.S. patent application Ser. No. 12/536,907 entitled "Full-Length Video Fingerprinting," to Sergey Ioffe filed Aug. 6, 2009, which is incorporated by reference herein.

BACKGROUND

1. Field of Art

The disclosure generally relates to the field of video processing, and, more particularly, relates to generating full-length video fingerprints.

2. Description of the Related Art

Online video hosting services allow users to upload videos for viewing by other users. Over time, an online video hosting service can acquire a very large video database that includes many videos. Typically, many videos in the database are either exact or near-duplicates of other videos in the database. Accurately detecting near-duplicate videos within the database improves system performance, for example, including improving the ability of the online video hosting service to manage its video inventory, providing better searches, and overall faster response time.

Many conventional approaches for detecting near-duplicate videos in a video database are generally extensions of conventional image analysis techniques. These techniques are typically applied to only a portion of a video, such as the first 30 seconds, or to a number of samples of a video, such as a 1 second portion every 10 seconds. As a result, if two videos of the same event have different start times and running lengths, the portions used for the fingerprints are unlikely to match.

SUMMARY

A computer-implemented method generates a full-length fingerprint for a video. In one implementation, a computer-readable storage medium can store computer-executable code that, when executed by a processor, causes the processor to perform the method for generating a full-length fingerprint of a video.

The method comprises accessing a plurality of subfingerprints for the video, each subfingerprint stored in a computer memory comprising a computer-readable storage medium and encoding features of a corresponding segment of the video. A subfingerprint is a data element that characterizes the corresponding video segment by representing one or more image and/or audio features of the corresponding video segment in a compressed, non-reversible format. In one embodiment, a subfingerprint comprises a vector of min-hash values generated by applying a min-hash procedure to an array of transform coefficients to the corresponding video segment.

The method further comprises generating a plurality of subhistograms, wherein each subhistogram is stored in a computer memory comprising a computer-readable storage medium and encodes a frequency of a subfingerprint feature for a subset of the plurality of subfingerprints accessed for the video. In one embodiment, each subhistogram encodes how many times a particular min-hash value occurred at a given position in the subfingerprints included the corresponding subset (or, equivalently, how many times a particular subfingerprint position has a particular min-hash value).

The method further comprises generating a master histogram is stored in a computer memory comprising a computer-readable storage medium and encodes a frequency of a plurality of subhistogram features for the plurality of subhistograms. In one embodiment, generating the master histogram comprises generating a plurality of bins, each bin specifying a subhistogram feature, determining a count for each generated bin, and populating the master histogram with identifiers for the generated bins and their corresponding count. In one embodiment, the master histogram comprises a concatenation of subhistograms.

The method further comprises applying a hashing procedure to the master histogram to generate the full-length video fingerprint. In one embodiment, the hashing procedure is a weighted min-hash procedure that includes assigning a weight to each bin included in the master histogram and applying a plurality of hash functions to a number of versions of each bin, the number of versions for a bin based on the assigned weight for the bin. The full-length fingerprint is stored in a computer memory comprising a computer-readable storage medium.

In one embodiment, the method further comprises performing a clustering procedure on full-length video fingerprints generated in the above-described manner such as locality sensitive hashing (LSH) or other conventional clustering and matching techniques suitable for determining similar items within large quantities of data. The clustering procedure produces a plurality of clusters, each of which can be assigned a unique cluster identifier. Upon ingest of a new video, a full-length fingerprint is generated for the video as described above and a determination is made as to whether or not the new video corresponds to any of the generated clusters based on the full-length fingerprint. Metadata for the video can be modified to identify that it corresponds to a particular cluster by, for example, including the cluster identifier for the cluster in the metadata.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

Figure (FIG.) 1 illustrates a block diagram of one embodiment of a system for detecting near-duplicate videos within a video database using full-length video fingerprints.

DETAILED DESCRIPTION

Figure 1:
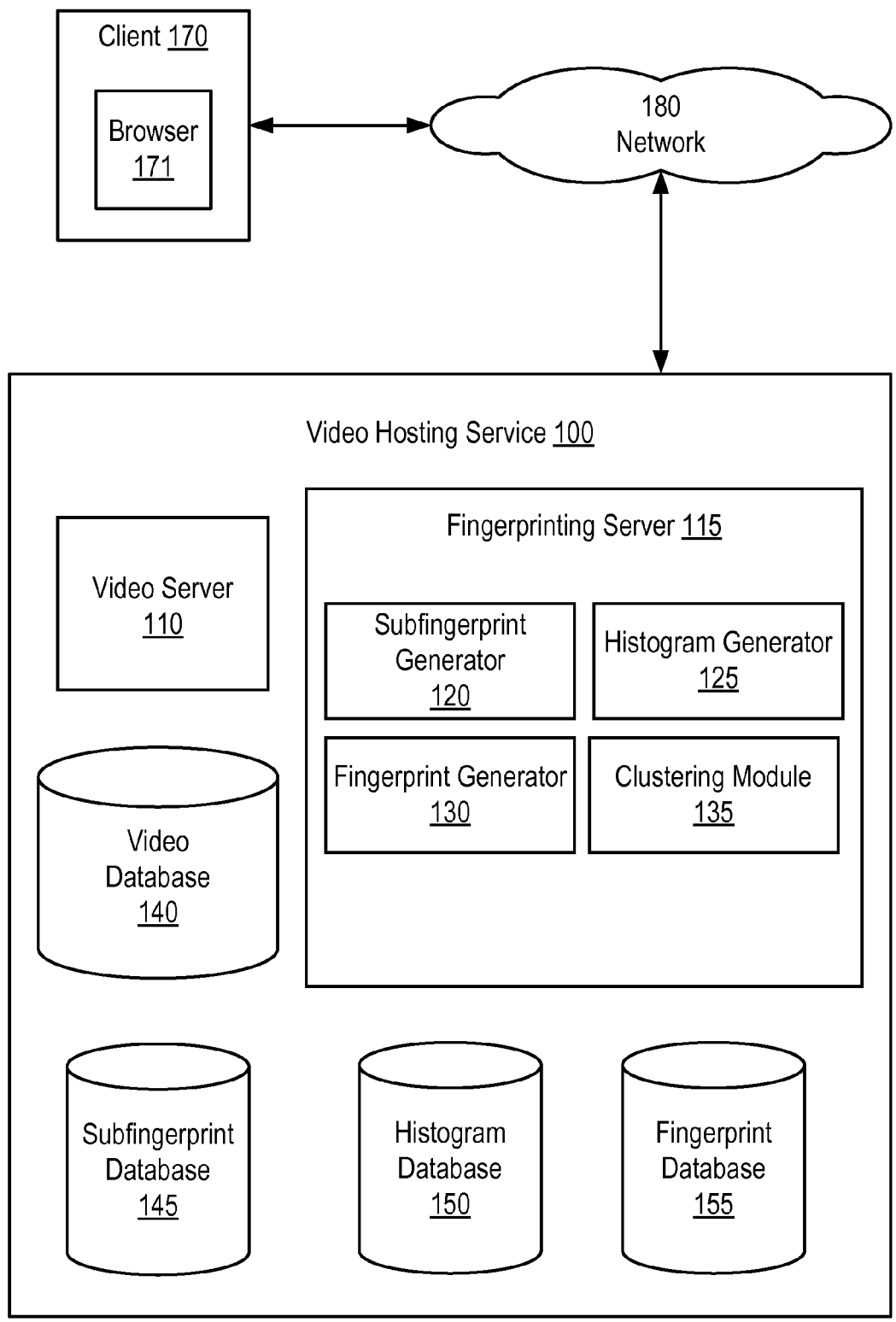

FIG. 1 illustrates an exemplary computing environment that supports a system for generating full-length video fingerprints and detecting near-duplicate videos within a video database using the full-length video fingerprints. In the embodiment of FIG. 1, a video hosting service 100 communicates over a network 180 with one or more client devices 170, each client 170 including a browser 171. The video hosting service 100 includes a video server 110, a fingerprinting server 115, a video database 140, a subfingerprint database 145, a histogram database 150, and a fingerprint database 155. The video hosting service 100 receives uploaded videos from some of the clients 170 and provides videos to clients 170 for viewing. The video hosting service 100 detects videos in the video database 140 that are duplicate or near-duplicate videos by creating and comparing full-length video fingerprints. As used herein, a duplicate or near-duplicate video is a video stored by the video database 140 that is either identical or highly similar to at least one other video in the video database 140. For example, two or more near-duplicate videos in the video database 140 can appear more or less identical to a viewer (e.g., two different recordings of the same television show), but have bit-level differences due to variations in compression, de-compression, noise level, frame rate, start and stop times, or source resolution.

The network 180 is typically the Internet, but can be any network, including but not limited to any combination of a LAN, a MAN, a WAN, a mobile, a wired or wireless network, a private network, or a virtual private network. Only a single client 170 is shown, but in practice there are many (e.g., millions) clients 170 that can communicate with and use the video hosting service 100. The browser 171 can include a content player (e.g., Flash™ from Adobe Systems, Inc.), or any other player adapted for the content file formats used by the video hosting service 100.

The video database 140, the subfingerprint database 145, the histogram database 150, and the fingerprint database 155 are communicatively coupled to the network 180 and can be implemented as any device or combination of devices capable of persistently storing data in computer readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the teachings here.

The video server 110 and the fingerprinting server 115 are also communicatively coupled to the network 180 and can be implemented as one or more server class computers. The server class computers can include one or more high-performance CPUs and 1G or more of main memory, as well as 500Gb to 2Tb of storage. An open-source operating system such as LINUX is typically used. The operations of the video hosting service 100 as described herein can be controlled through either hardware (e.g., dedicated computing devices or daughter-boards in general purpose computers), or through computer programs installed in computer storage on the servers of the service 100 and executed by the processors of such servers to perform the functions described herein. One of skill in the art of system engineering and video analysis will readily determine from the functional and algorithmic descriptions herein the construction and operation of such computer programs.

In one embodiment, the video server 110 receives videos uploaded by clients 170 over the network 180 and processes them for storage by the video database 140. The video server 110 also receives requests for videos from clients 170 through the network. In response to received requests, the video server 110 retrieves videos stored by the video database 140 and distributes them to clients 170 over the network 180. Some of the videos received and distributed by the video server 110 are duplicate or near-duplicate videos.

The video database 140 stores data for a plurality of videos. Each video comprises video data that includes coded data for frames of the video. Typically, the coded data represents pixel values that determine the visual appearance of pixels of the video frames. The coded data depends on the underlying video and audio codecs used for encoding the videos, and for example includes video/audio transform coefficients, frame and window information, coding parameters, and so forth.

In one embodiment, the fingerprinting server 115 processes videos stored in the video database 140 to generate full-length fingerprints, which represent the content in the full length of a video. The full-length fingerprints are used to determine if a given video is a duplicate or near-duplicate of another video. The fingerprinting server 115 includes a subfingerprint generator 120, a histogram generator 125, a fingerprint generator 130, and a clustering module 135.

Given a video for processing, the subfingerprint generator 120 divides the video into a plurality of segments and computes a plurality of corresponding subfingerprints. A subfingerprint is a data element that encodes data related to image and/or audio features of the corresponding video segment. In one embodiment, subfingerprints comprise min-hash values based on such features. The subfingerprint generator 120 can also create a subfingerprint array that comprises multiple subfingerprints for a video. Further details of the subfingerprint generator 120 as well as subfingerprints and subfingerprint arrays are provided below in reference to FIGS. 2A-2D, wherein example embodiments of a subfingerprint array and subfingerprinting methods are illustrated. Subfingerprints and subfingerprint arrays generated by the subfingerprint generator 120 are stored in the subfingerprint database 145.

The histogram generator 125 can receive subfingerprints from the subfingerprint generator 120 or can retrieve subfingerprints from the subfingerprint database 145. The histogram generator 125 first transforms multiple subfingerprints into a subhistogram. A subhistogram is a data element that encodes information about a number of occurrences for a particular subfingerprint feature in a plurality of subfingerprints (e.g., how many subfingerprints in the plurality of subfingerprints have the particular feature). A feature of a subfingerprint can be, for example, an element of a subfingerprint having a particular min-hash value. The histogram generator 125 can create multiple subhistograms for a single video.

The histogram generator 125 then transforms the data included in one or more subhistograms to generate a master histogram for the video. The master histogram encodes information about a number of occurrences for a particular subhistogram feature in the one or more subhistograms (e.g., how many subhistograms associated with the video have the particular feature). Subhistograms and master histograms generated by the histogram generator 125 are stored in the histogram database 150. Further details of the histogram generator 125 as well as subhistograms and master histograms are provided below in reference to FIGS. 3A-3D.

The fingerprint generator 130 transforms a master histogram for a video into a fingerprint for the video. In one embodiment, the fingerprint generated by the fingerprint generator is a full-length fingerprint that encodes information about the entire video. This is in contrast to conventional segment-based techniques that generate fingerprints which encode information about only a portion of a video. The fingerprint generator 130 generates a full-length video fingerprint by executing a hashing procedure that transforms the data within the master histogram for the video into a single data element representative of features of the entire video. Conventional video analysis techniques are typically applied to only a portion of a video because of the excessively large amount of data that would be produced by their application to the full length of the video. In one embodiment, a full-length fingerprint generated by the fingerprint generator 130 for a video comprises a compact representation of the entire video. Hence, not only are features of the entire video encoded, but the amount of data related to an entire video is reduced relative to the mere application of conventional video analysis techniques to the entire video. The fingerprint generator 130, fingerprints, and the hashing algorithm are detailed below in reference to FIG. 5 in which an illustrative embodiment of a full-length video fingerprint is included. Fingerprints generated by the fingerprint generator 130 are stored in the fingerprint database 155.

One embodiment of the clustering module 135 operates upon fingerprints generated by the fingerprint generator 130 to identify fingerprints that are substantially similar using one or more data clustering procedures. The clustering module 135 can then identify videos associated with similar fingerprints as near-duplicate videos. In one embodiment, the clustering module 135 identifies a video associated as a near-duplicate video by appending or modifying metadata for the video included in the video database 140. The metadata can indentify one or more other videos as near duplicates of the video. The metadata can also help the video hosting service 100, for example, provide improved searching and browsing capabilities (e.g., by not presenting to the user an excessive number of near-duplicate results in response to a query), propagate metadata among videos, or identify videos as suitable for various management policies (e.g., videos suitable for monetization via a particular advertisement or subscription policy, videos which should be eliminated from the database, etc.). In one embodiment, the clustering module 135 utilizes a type of Hamming distance metric for multiple fingerprints as part of identifying similar fingerprints. Details of the clustering module 135 and the data clustering procedures employed thereby are provided below in reference to FIG. 5.

Numerous variations from the system architecture of the illustrated video hosting service 100 are possible. The components of the service 100 and their respective functionalities can be combined or redistributed. For example, the video database 140, subfingerprint database 145, histogram database 150, and/or fingerprint database 155 can be distributed among any number of storage devices. Furthermore, the functionalities ascribed herein to any of the subfingerprint generator 120, histogram generator 125, fingerprint generator 130, and clustering module 135 can be implemented using a single computing device or using any number of distributed computing devices communicatively coupled via a network.

Subfingerprint Generation

Figure 2A:
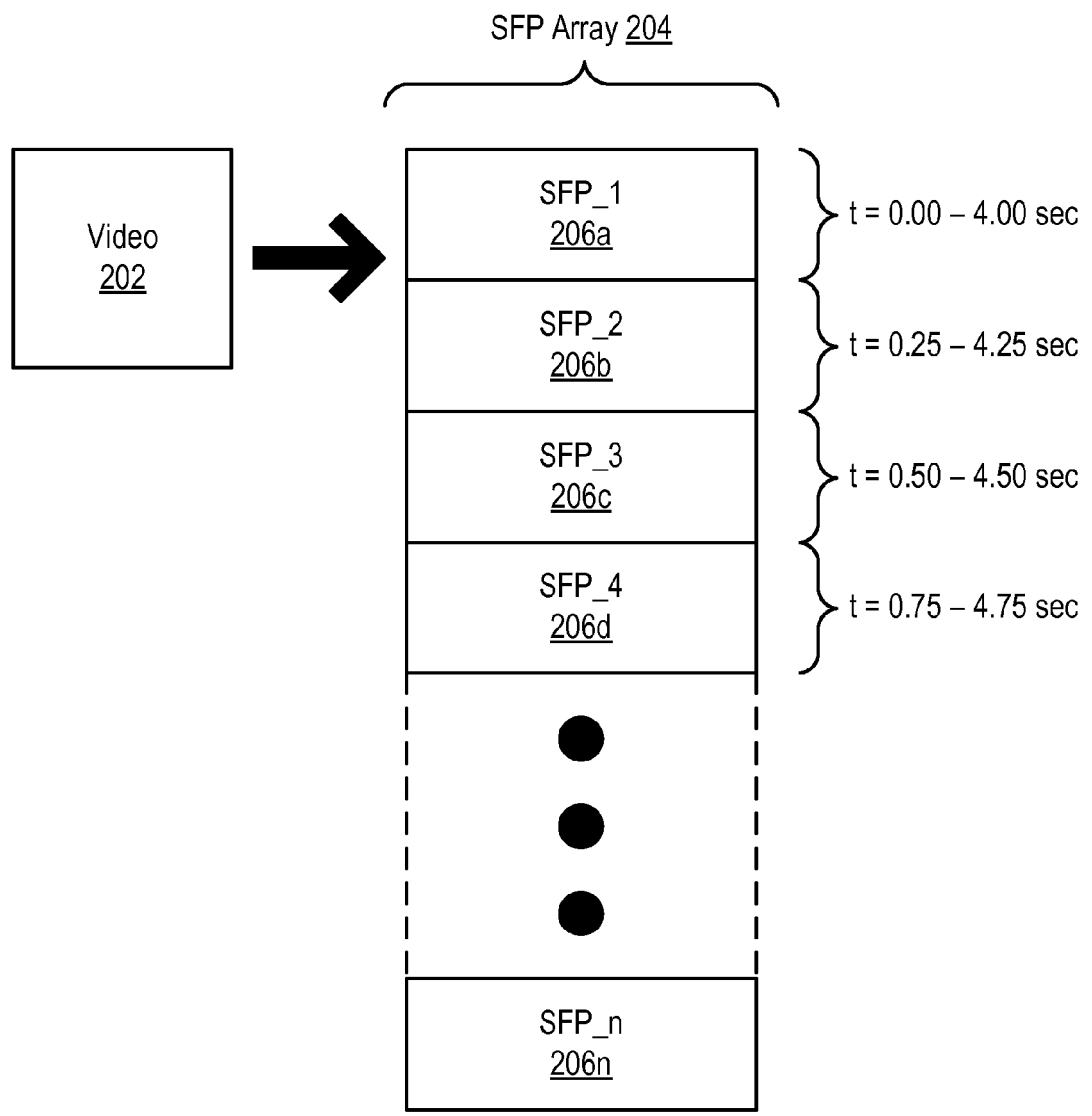
FIG. 2A illustrates an array of subfingerprints for a video in accordance with one embodiment.

FIG. 2A illustrates one embodiment of a subfingerprint (SFP) array 204 generated by the SFP generator 120. The SFP generator 120 receives a video 202 and transforms the associated video data into one or more subfingerprints 206. A subfingerprint 206 is a data element that characterizes a video segment by representing one or more image and/or audio features of the video segment in a compressed, non-reversible format. Each SFP 206 generated by one embodiment of the SFP generator 120 characterizes a corresponding four-second segment of the video 202. The four-second segments of the video overlap each other with a temporal offset of 0.25 seconds; the temporal offset can be made longer or shorter as needed. Hence, as illustrated in FIG. 2, a first SFP_1 characterizes the video 202 between 0.00 and 4.00 seconds on the playback timeline for the video 202, SFP_2 characterizes the video 202 between 0.25 and 4.25 seconds, a SFP_3 characterizes the video 202 between 0.50 and 4.50 seconds, and so on for the duration of the video 202. In other embodiments, other segment durations and segment offsets can be used. The SFP generator 120 can create an SFP array 204 for the video 202 that comprises all or a subset of the subfingerprints 206 created for the video 202. As is apparent then, the number of subfingerprints 206 for a video is a function of the length of the video, the temporal extent for the subfingerprint, and the amount of temporal overlap between subfingerprints.

Figure 2B:
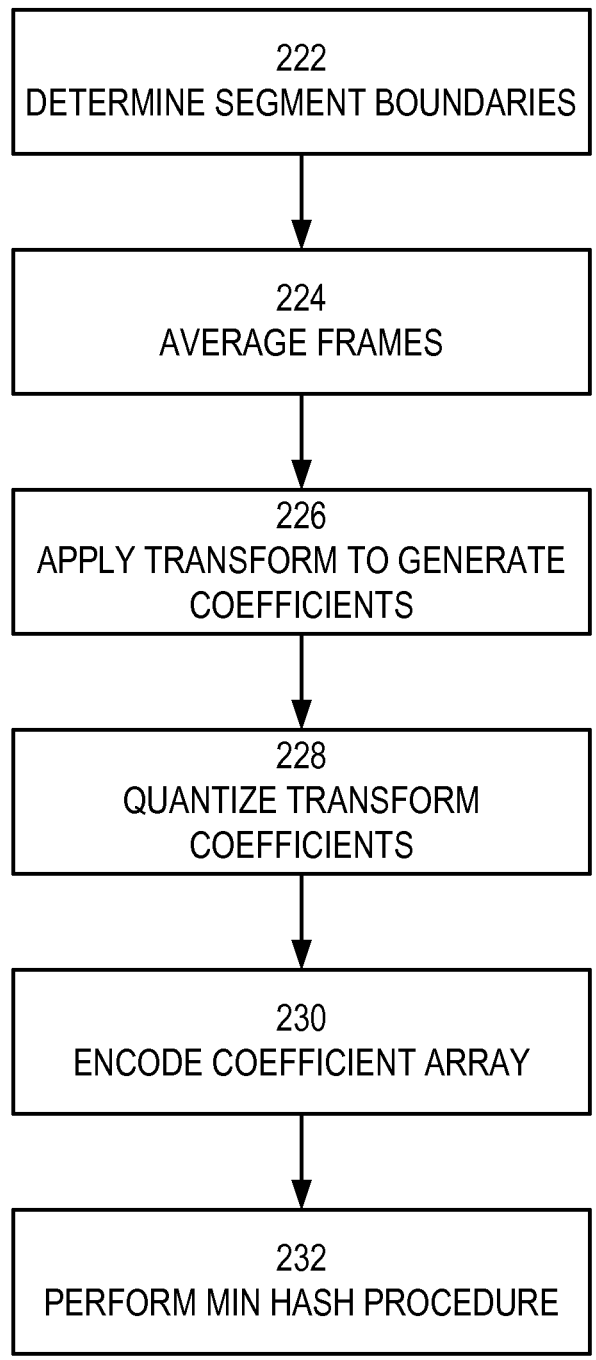
FIG. 2B illustrates one embodiment of a method for generating a subfingerprint for a video segment.

FIG. 2B is a flowchart illustrating the operations of the SFP generator 120 to generate an SFP 206 for a video segment according to one embodiment. Other embodiments can perform one or more steps of FIG. 2B in a different sequence. Moreover, other embodiments can include additional and/or different steps than the ones described herein.

The SFP generator 120 determines 222 boundaries for the segment. A boundary for the segment can comprise temporal boundaries (e.g., the start and stop times of the segment in terms of a playback timeline for the video 202) as well as spatial boundaries (e.g., borders for the video frames included in the segment). The SFP generator 120 can then average 224 video frames included in the video segment, transforming the data in the video segment into an average video frame with pixel data having average pixel values for the duration of the segment.

The SFP generator 120 transforms the video segment by applying 226 one or more transforms to the average video frame (or to all frames of the video segment in embodiments in which the averaging 224 step is omitted). A transform is a data processing operation that transforms given input video data (e.g., the averaged video frame) and outputs an array of coefficients which characterize spatial and temporal features of the input video data (e.g., edge locations and magnitudes, luminance features, and temporal gradients). The array of coefficients generated by applying 226 the transform can be either a single dimensional array or a multi-dimensional array. The coefficients can have both a magnitude and a sign. One embodiment of the SFP generator 120 applies 226 a Haar wavelet transform to the video segment. Other types of transforms can be applied 226 such as, for example, a Gabor transform or other related transform. The SFP generator 120 can apply 226 the above-listed or other transform techniques using boxlets, summed-area tables, or integral images. This step transforms the representation of the video from the pixel domain to the transform coefficient domain.

The SFP generator 120 then quantizes 228 the wavelet coefficients in the array. Various quantization techniques are possible. For example, in one quantization 228 process, the SFP generator 120 determines the N coefficients with the largest absolute values; N may be a predetermined number or may be determined dynamically based on various constraints. The SFP generator quantizes 228 the N coefficients to +1 or −1 by preserving the signs of the N coefficients and setting the remaining coefficients to zero. For example, in one embodiment there are 64 wavelet coefficients, and the SFP generator 120 preserves the signs of the largest 32 wavelet coefficients and sets the other 32 wavelet coefficients to zero. In a second example, coefficients are quantized 228 by comparing the magnitude of each coefficient to a predetermined threshold value. Any coefficient with a magnitude greater than the threshold value is quantized 228 to +1 or −1 by preserving its sign, and the remaining coefficients are quantized 228 to zero. In a third example quantization 228 process, constraints are placed on both the number of coefficients and their magnitudes. In this process, the SFP generator 120 quantizes 228 only the N greatest coefficients that have a magnitude greater than a threshold value to +1 or −1, and quantizes 228 the remaining coefficients to zero. As a result of any of these quantization processes, there is produced a coefficient array comprising sequence of −1, 0, and +1 values. This step further transforms the representation of the video into a data-independent domain of sign values.

In addition to the quantizing 228 process, the SFP generator 120 encodes 230 the quantized 228 coefficient array to a one-dimensional bit vector, reducing the dimensionality of the coefficient array if necessary. If, for example, each bit is quantized to +1, −1, or 0, a two-bit encoding scheme uses the bits 10 for +1, 01 for −1, and 00 for zero. Various other encoding 230 techniques are possible without departing from the scope of the invention. Quantizing 228 and encoding 230 the transform coefficients thereby creates a sparsely populated bit vector that retains the sign (e.g., positive or negative) of the selected N transform coefficients (e.g., those having a sufficiently large magnitude).

Figure 2C:
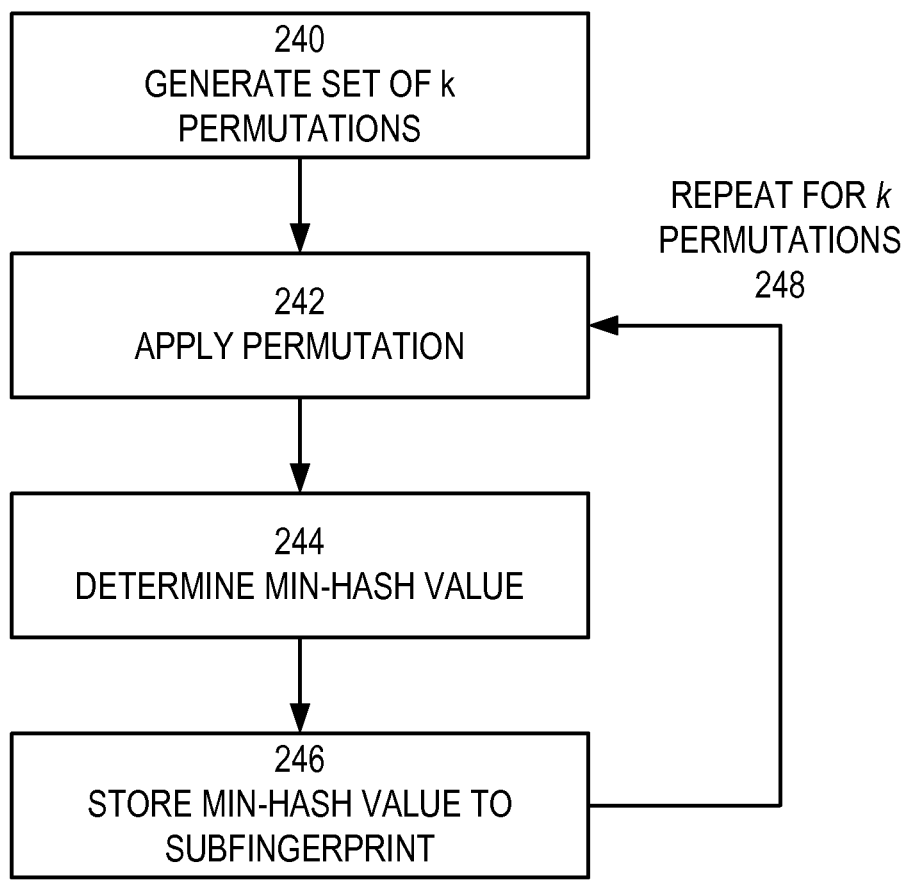
FIG. 2C illustrates one embodiment of a min-hash procedure.

The SFP generator 120 performs 232 a min-hash procedure on the bit vector to create an SFP 206 for the segment. FIG. 2C is a flow chart illustrating an embodiment of a min-hash procedure performed 232 by the SFP generator on a bit vector. First, a set of k permutations are generated 240. Each of the k permutations specifies a particular way of rearranging some elements (e.g., bits) of a bit vector. When a permutation is applied to a bit vector of length L, the permutation may be expressed as a sequence of integers between 1 and L in which the integers correspond to bit locations within the bit vector. Each such integer appears at most once in the permutation. Therefore, the permutation will have, at most, the length L. For example, when L=5, some valid permutations are (2,4,1, 5,3), (1,2,3,4), and (4,2,1). Using this representation, a permutation P=(2,4,1,5,3), for example, indicates that the $1^{st}$ bit of the re-arranged bit vector is assigned the value of the $2^{nd}$ bit of the input bit vector, the $2^{nd}$ bit of the re-arranged bit vector is assigned the value of the $4^{th}$ bit of the input bit vector, the $3^{rd}$ bit of the re-arranged bit vector is assigned the value of the $1^{st}$ bit of the input bit vector, and so on. For example, when rearranging the sequence "ABCDE" according to the permutation (4,2,1), the arrangement "DBA" is obtained, since the first element of the permutation is 4 and the $4^{th}$ entry of the sequence is "D", and so on. Each of the k permutations is applied 242 to re-arrange the bits of the bit vector to generate a set of k re-arranged bit vectors. Once generated 240, the permutations are typically fixed and applied 242 in the same order to each bit vectors on which the SFP generator 120 performs 230 the min-hash procedure.

The min-hash value is determined 244 as the position (offset) of the first non-zero value (e.g., 1) in the rearranged bit vector. For example, if the first non-zero value in a given re-arranged bit vector occurs in the $12^{th}$ position, then the min-hash value is 12. Different techniques can be used to handle cases where no non-zero value appears in the rearranged sequence. For example, in one embodiment, the min-hash value is set to a special value indicating that the bit vector is empty. The determined 244 min-hash value is then stored 246 as an element of the SFP 206, which in one embodiment comprises a single dimensional vector of min-hash values. This process of applying permutations and recording min-hash values then repeats 248 for each of the k permutations.

Thus, the SFP 206 includes k min-hash values, with each min-hash value indicating a position of the first bit value of "1" in the underlying bit vector after applying each permutation. In one embodiment, k is 100 and each SFP 206 produced by the SFP generator 120 comprises 100 min-hash values and represents four seconds of the video 202. Each min-hash value is encoded as a byte of data representing a number between 0 and 255. Hence, when k is 100, each SFP 206 is 100 bytes and includes 100 min-hash values. Other values of k are possible. Additionally, though each of the k min hash-values in an SFP 206 are primarily described herein as encoded using a single byte of data, a min-hash value can be encoded for a position using any amount of data. It should be appreciated at this point, that the described steps significantly reduce the amount of data necessary to represent the video of the segment. A four second segment of 640×480, 16 bit video takes 2,457,600 bytes of pixel data. Using the above methods, this same four second segment is now represented by just 100 bytes of data.

Figure 2D:
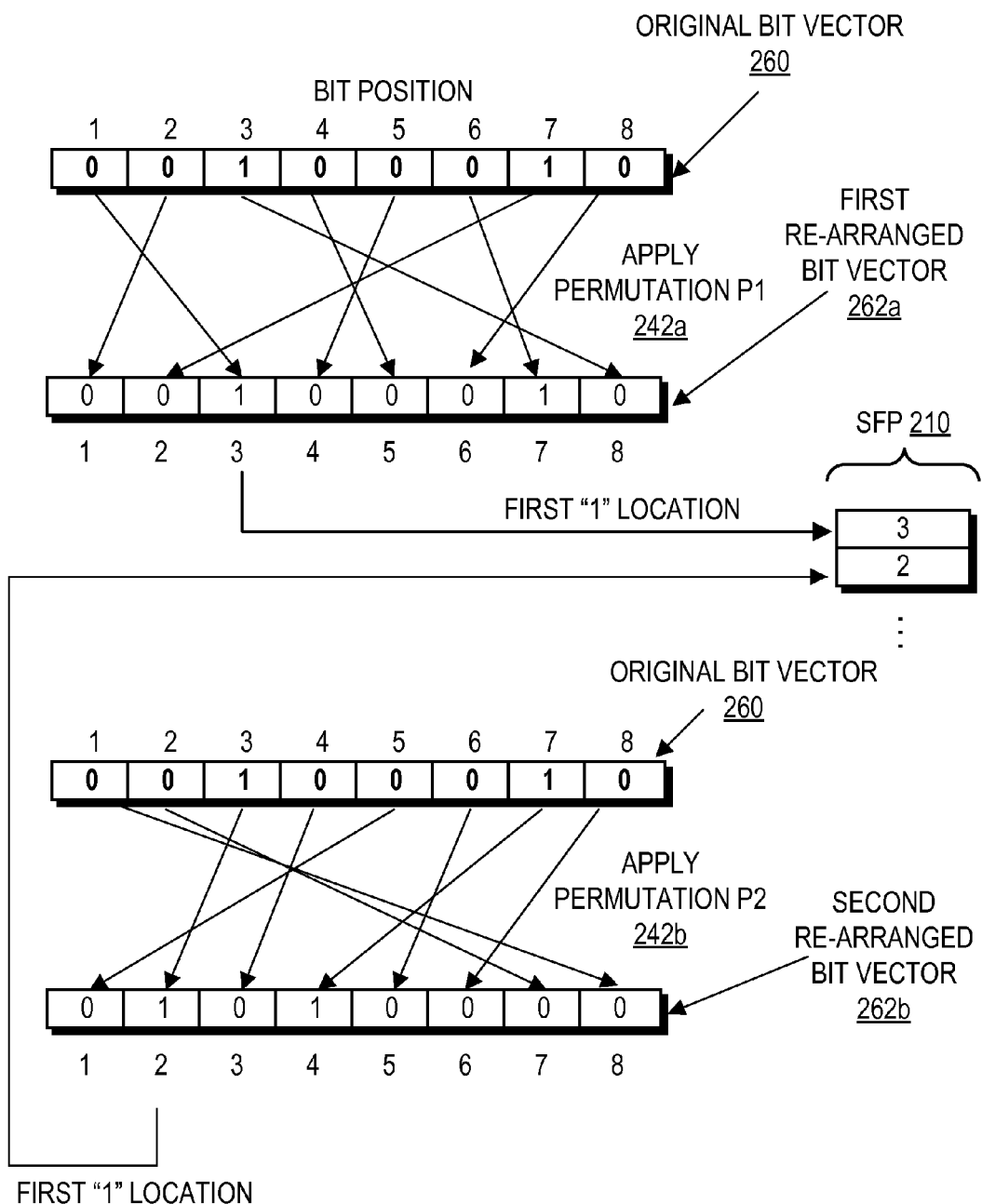
FIG. 2D illustrates the application of one embodiment of a min-hash procedure to a bit vector.

Turning now to FIG. 2D, the above-described processes of applying 242 a permutation and determining 244 a min-hash value are detailed for an example input bit vector 260 using example permutations P(1,1)={2,7,1,5,4,8,6,3} and P(2,1)= (5,3,4,7,6,8,2,1). As can be seen in the application 242$a$ of P(1,1), the SFP generator 120 assigns the $1^{st}$ bit of the first re-arranged bit vector 262$a$ to the value of the $2^{nd}$ bit of the original bit vector 260, the $2^{nd}$ bit of the first re-arranged bit vector 262$a$ is assigned the value of the $7^{th}$ bit of the original bit vector 260, and so on. The SFP generator 120 then scans the re-arranged bit vector 304 for the location of the first "1". In the illustrated example, this location is found at bit position "3". Thus, the permutation module 114 records a min-hash value of "3" in the first entry (position) of the SFP 206. Next, the SFP generator 120 applies 242$b$ a second permutation P(2,1) to the original bit vector 260 to yield a second re-arranged bit vector 262$b$. Again, the second re-arranged bit vector 262$b$ is scanned for the location of the first "1" (in this case, position "2") and a min-hash value of "2" is recorded in the second position of the SFP 206. The process repeats for the remaining k permutations to generate the full SFP 206, which will therefore have k positions with each position having a min-hash value.

Using the same fixed set of permutations, subfingerprints 206 can be generated for a plurality of input vectors representing for example, multiple video segments for the video 202. The SFP generator 120 can repeat subfingerprinting process outlined in FIGS. 2A-2D for each video segment in the video 202. The ordered set of subfingerprints 206 generated form an SFP array 204 for the entire video 202 file. Subfingerprints 206 and SFP arrays are stored in the SFP database 145 or passed directly from the SFP generator 120 to the histogram generator 125.

Histogram Generation

Figure 3A:
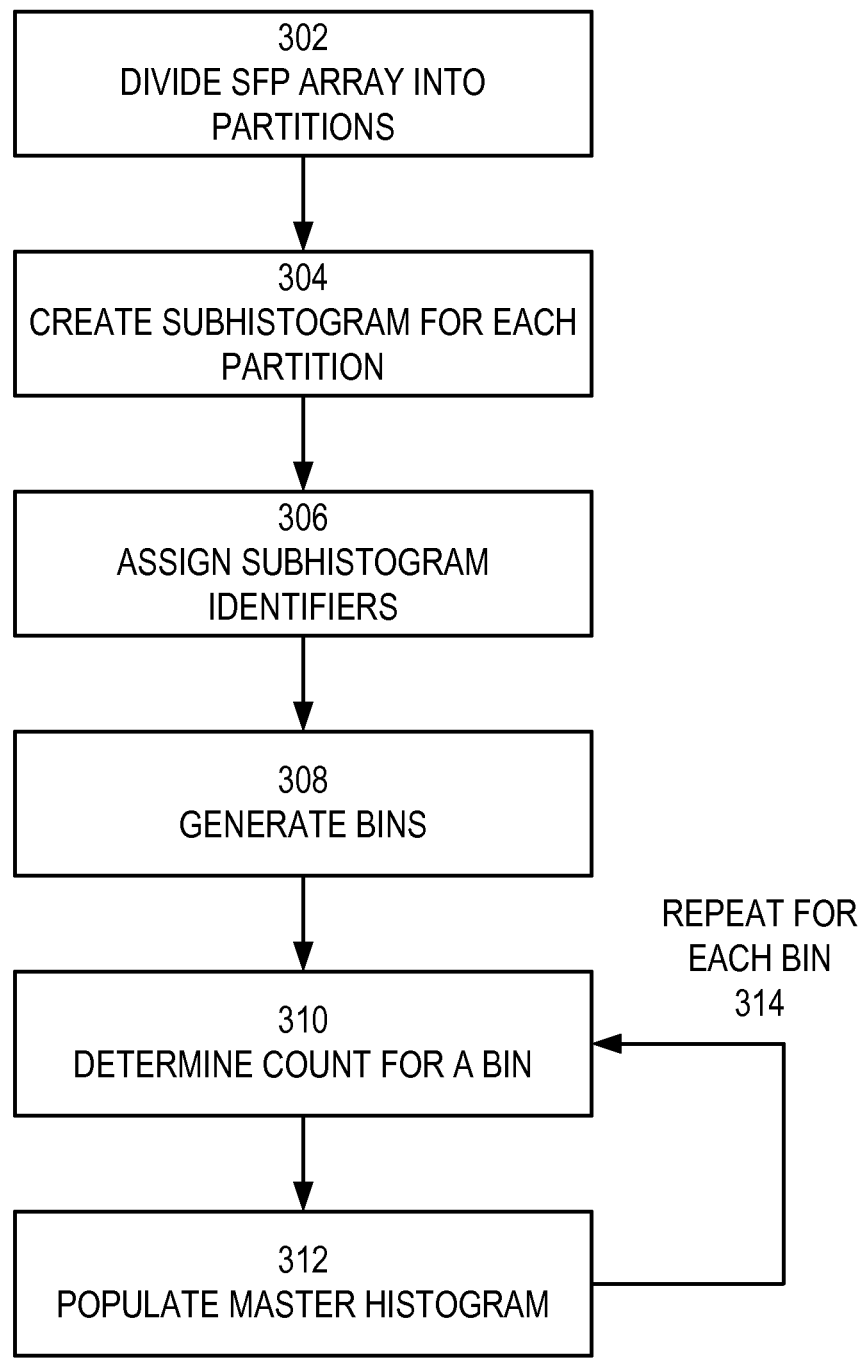
FIG. 3A illustrates one embodiment of a method for generating a master histogram for a video.
Figure 3B:
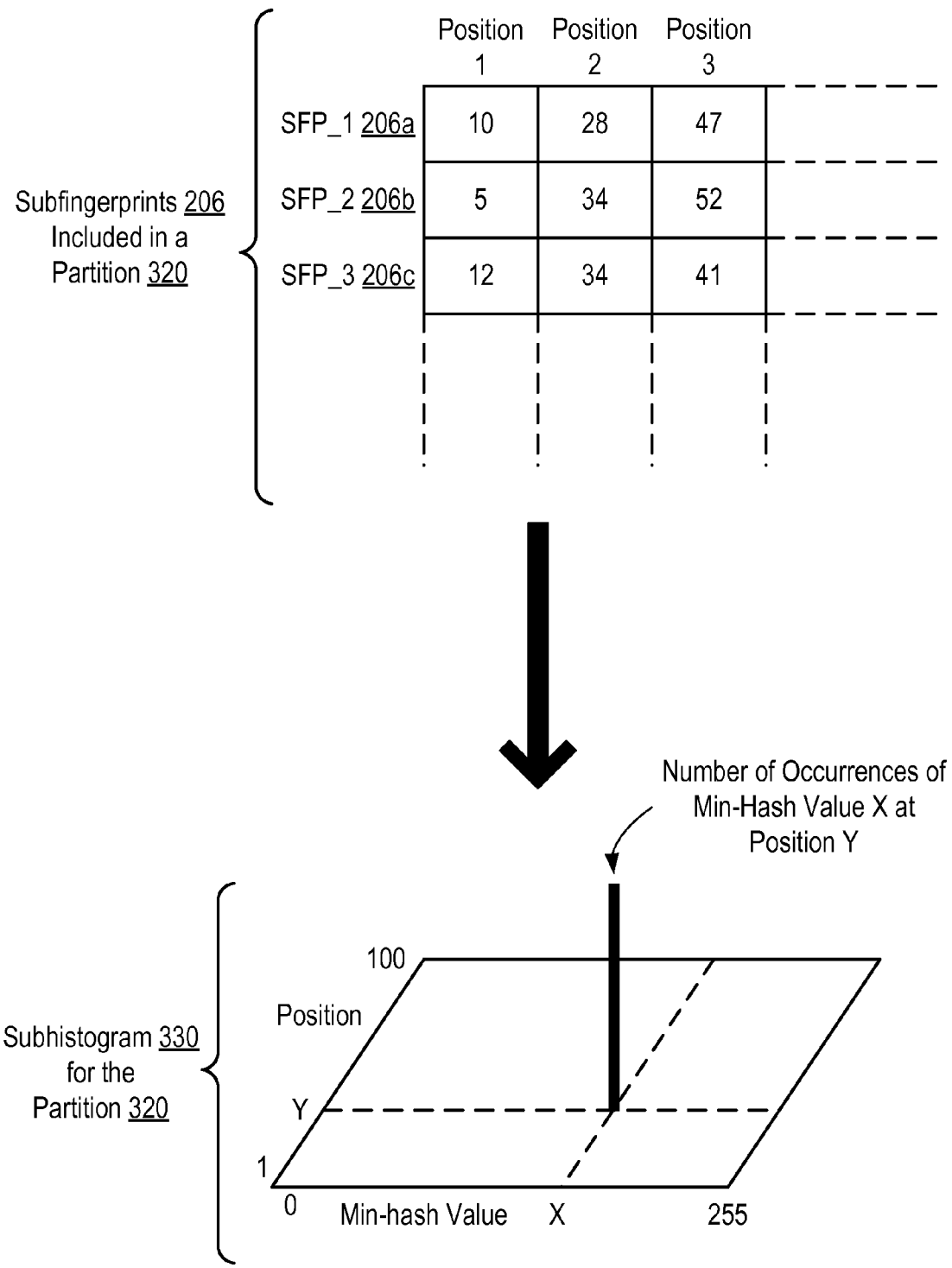
FIG. 3B illustrates aspects of one embodiment of a method for generating a subhistogram for a video from subfingerprints for the video.
Figure 3C:
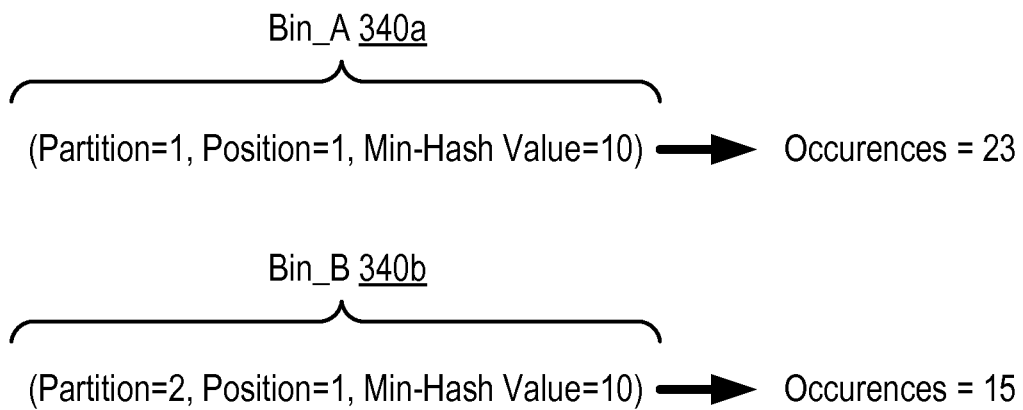
FIG. 3C illustrates master histogram bins for a video according to one embodiment.
Figure 3D:
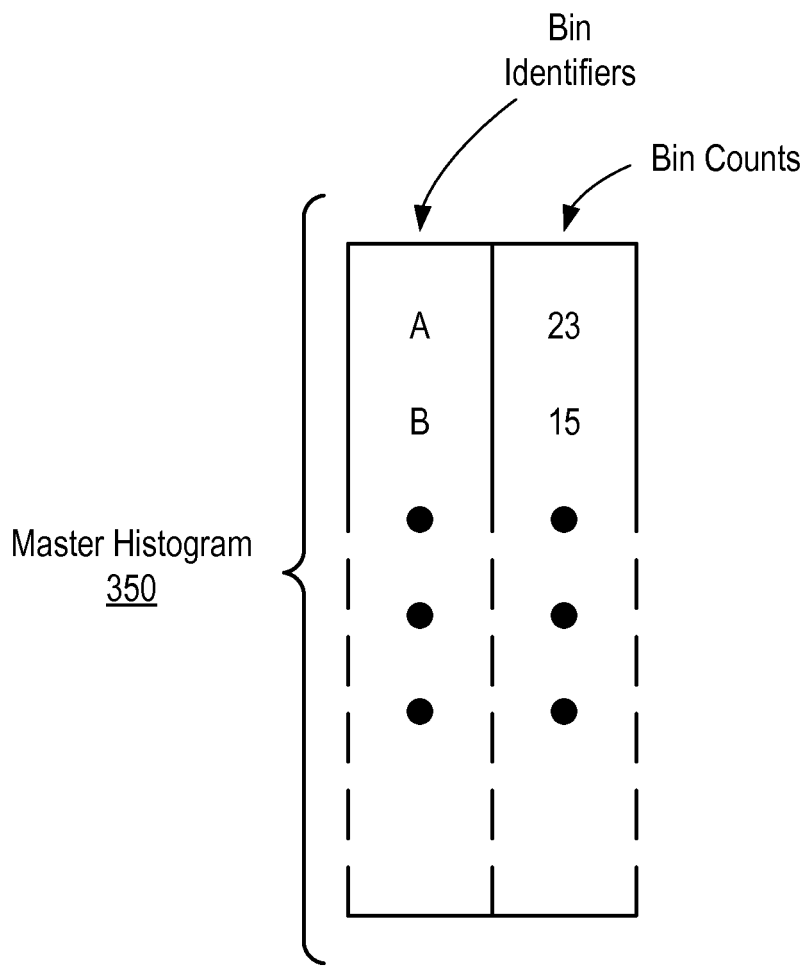
FIG. 3D illustrates a master histogram for a video in accordance with one embodiment.

The histogram generator 125 transforms a plurality of subfingerprints 206 (e.g., an SFP array 204) into one or more subhistograms and then transforms one or more subhistograms into a master histogram for the video. FIG. 3A illustrates a flowchart of a method for generating subhistograms and a master histogram for the video 202 employed by one embodiment of the histogram generator 125. Other embodiments can perform one or more steps of FIG. 3A in a different sequence. Moreover, other embodiments can include additional and/or different steps than the ones described herein. FIG. 3B illustrates aspects of subhistograms 330 and subhistogram 330 generation according to one embodiment. FIGS. 3C and 3D illustrate aspects of master histograms 350 and master histogram generation according to one embodiment.

The histogram generator 125 divides 302 an SFP array 204 into one or more partitions 320 wherein each partition 320 comprises a number of subfingerprints 206. For example, in one embodiment, each partition 320 comprises one-hundred twenty subfingerprints 206. If each SFP 206 in the SFP array 204 has an offset of 0.25 seconds as illustrated in FIG. 2A, then a partition 320 comprising one-hundred twenty subfingerprints 206 characterizes thirty seconds of the video 202 (120 * 0.25 seconds=30 seconds). In one embodiment, a subhistogram 330 for a partition 320 is a three-dimensional data matrix that encodes how often a particular min-hash value occurs at a particular position of the subfingerprints 206 included in the partition 320.

Referring now to FIG. 3B, the first three positions of three subfingerprints 206 included in a partition 320 are illustrated. A small number of subfingerprints 206 and a small number of positions are illustrated for visual clarity. As indicated by the dashed lines in FIG. 3B, the subfingerprints 206 can include many more positions (e.g., 100) and the partition 320 can include many more subfingerprints 206 (e.g., 120). The SFP_1 has a first position with a min-hash value of 10, a second position with a min-hash value of 28, and a third position with a min-hash value of 47. The SFP_2 has a first position with a min-hash value of 5, a second position with a min-hash value of 34, and a third position with a min-hash value of 52. The SFP_3 has a first position with a min-hash value of 12, a second position with a min-hash value of 34, and a third position with a min-hash value of 41.

The histogram generator 125 creates 304 a subhistogram 330 that encodes how many times a particular min-hash value occurred at a given position in the subfingerprints 206 included the partition 320 (or, equivalently, how many times a particular position has a particular min-hash value). For example, in the partition 320 illustrated in FIG. 3, the min-hash value 34 occurs at the second position of at least two subfingerprints SFP_2, SFP_3 (or, equivalently, the second position of at least two subfingerprints SFP_2, SFP_3 has the min-hash value 34). Hence, in one embodiment, a subhistogram 330 is a three-dimensional array that includes a position dimension which varies from 1 to 100 (each SFP 206 having 100 positions), a min-hash value dimension which varies from 0 to 255 (each min-hash value encoded as a byte), and a number of occurrence dimension which varies from 0 to 120 (each partition 320 including 120 subfingerprints 206). In other embodiments, an SFP 206 can include a different number of positions, a min-hash value can be encoded for a position using a different amount of data, and a partition 320 can include a different number of subfingerprints 206.

The histogram generator 125 transforms a plurality of subhistograms 330 for a video 202 into a master histogram 350 for the video 202. The master histogram 350 encodes information about a number of occurrences for a particular subhistogram feature in the one or more subhistograms 330 (e.g., how many subhistograms 330 associated with the video have the particular feature). In one embodiment, the master histogram 350 is a concatenation of the one or more subhistograms 330 for the video 202. Thus, the master histogram 350 can encode a frequency of subfingerprint features for the full duration of the video 202 based on the information included in one or more associated subhistograms 330. The master histogram 350 therefore also encodes a frequency of SFP 206 features and, like a subhistogram 330, can include a position dimension, a min-hash value dimension, and a number of occurrences dimension. As detailed below, the master histogram 350 can also reduce any combination of dimensions included in a subhistogram to a single dimension by encoding the combination of dimensions as a tuple or other suitable identifier.

The histogram generator 125 assigns 306 an identifier to each subhistogram 330 identifying the partition 320 to which it corresponds. For example, a partition 320 corresponding to the first thirty seconds of the video 202 can be assigned 306 an identifier indicating that is a first partition 320a associated with the video 202, a partition 320 corresponding to the second thirty seconds of the video 202 can be assigned 306 an identifier indicating that is a second partition 320b associated with the video 202, and so on. Many varieties of partition 320 identifiers are possible.

The histogram generator 125 then generates 308 a plurality of bins 340, each bin 340 comprising a tuple of subhistogram 330 features. For example, in FIG. 3C, a first bin 340a corresponds to a three-element tuple {Partition=1, Position=1, Min-hash Value=10} in which the first element identifies a first partition 320a, the second element identifies the first position in the partition, and the third element indicates a min-hash value of 10 at this position. Similarly, a second bin 340b corresponds to a three-element tuple in which the first element indicates a second partition 320b, the second element indicates a first position, and the third element indicates a min-hash value of 10. As part of defining 308 the bins 340, the histogram generator 125 can assign a bin identifier to each bin 340. For example, in the histogram 350 of FIG. 3C, the first bin 340a is assigned the identifier "A" and the second bin 340b is assigned the identifier "B". The dashed lines and vertical dots included in the histogram 350 indicate that more bins 340 have been defined 308 and assigned a corresponding identifier but are not shown to preserve illustrative clarity. In other embodiments, a bin identifier for a bin 340 can be the tuple corresponding to the bin 340 or any other manner of identifier suitable for uniquely denoting the bin 340.

The histogram generator 125 determines 310 a count for each bin 340 and populates 312 the histogram 350 with the determined 310 count. For example, in FIGS. 3C and 3D, the histogram generator 125 has determined 310 a count of "23" for the first bin 340a, indicating that in the subhistogram 330 corresponding to the first partition 320a, 23 of the subfingerprints 206 included in the first partition 320a were found to have a first position with a min-hash value of 10. The histogram generator 125 has also determined 310 a count of "15" for the second bin 340b, indicating that in the subhistogram 330 corresponding to the second partition 320b, 15 of the subfingerprints 206 included in the second partition 320b were found to have a first position with a min-hash value of 10. Thus, in one embodiment, determining 310 a count for a bin 340 comprises concatenating the number of occurrences dimension of the subhistograms 330 included in the bin 340.

The histogram generator 125 repeats 314 the determining 310 and populating 312 steps for each defined 308 bin 340 associated with the video 202 to complete the histogram 350 for the video. Hence, in one embodiment, the histogram 350 is a multi-dimensional array that encodes how many times a particular set of subhistogram 330 features occurs in association with a video 202 (e.g., how many times did the first position of an SFP 206 have a min-hash value of 10 in the first partition 320a associated with the video 202).

Bins can be generated 308 using a tuple of any type of combination of subhistogram 330 elements. For example, a bin can be generated 308 for multiple positions within the subfingerprints 206 in a partition 330. One example is a five-element tuple such as {Partition=1, First Position=1, First Min-Hash Value=10, Second Position=2, Second Min-Hash Value=17} in which the first element indicates a first partition 320a, the second element indicates a first position, the third element indicates a first min-hash value of 10, the fourth element indicates a second position, and the fifth element indicates a second min-hash value of 17. The example bin would therefore have a count that reflects a first number of occurrences for subfingerprints 206 in the first partition 320a with a first position having a min-hash value of 10 plus a second number of occurrences for subfingerprints 206 in the first partition 320a with a second position having a min-hash value of 17. The histogram generator 125 would therefore determine 310 the corresponding count based on the entries in the subhistogram 330 for the first partition 320a. Subhistograms 330 and histograms 350 are stored in the histogram database 150 or passed directly from the histogram generator 125 to the fingerprint generator 130. One embodiment of the histogram generator 125 generates only a single subhistogram 330 for a video 202, and the master histogram 350, being a concatenation of subhistograms 330 for the video, merely comprises the information in the single subhistogram 330.

Fingerprints

Figure 4A:
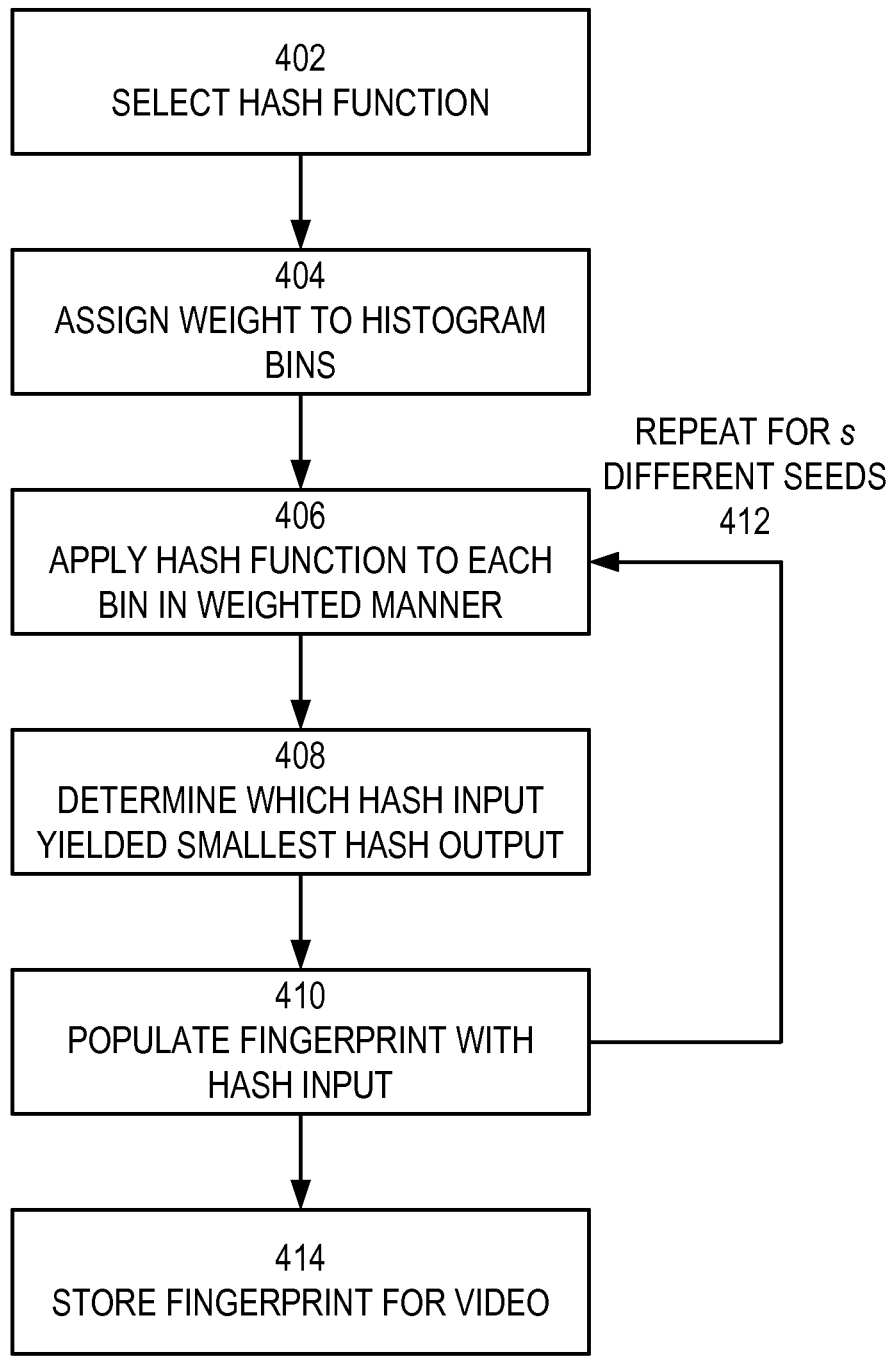
FIG. 4A illustrates one embodiment of a method for generating a fingerprint for a video from a master histogram for the video.

The fingerprint generator 130 transforms data included in a histogram 350 for a video 202 into a full-length fingerprint for the video 202. In one embodiment, the fingerprint generator 130 applies a weighted min-hash procedure to the histogram 350 to generate the fingerprint. FIG. 4A illustrates a flowchart of one embodiment of a weighted min-hash procedure 400 implemented by the fingerprint generator 130. Other embodiments can perform one or more steps of FIG. 4A in a different sequence. Moreover, other embodiments can include additional and/or different steps than the ones described herein.

First, the fingerprint generator 130 selects 402 a hash function to apply to the histogram 350 data. The selected 402 hash function can be a conventional hash function such as, for example, a Jenkins hash function, a Bernstein hash function, a Fowler-Noll-Vo hash function, a MurmurHash hash function, a Pearson hashing function, or a Zobrist hash function. The selected 402 hash function is a seeded hash function. A seeded hash function can be described as a function that accepts two inputs, e.g., f(X, Y). The first input X is a set of data (e.g., 32 bits of data), and the second input Y is a seed value. The seed value is typically a number (e.g., 1, 2, 3 . . . ). The selected 402 hash function treats X and Y as a pair, outputting a hash value that is affected by both X and Y. The output of the hash function is a single real number, such as an integer.

The fingerprint generator 130 then assigns 404 a weight w to each bin 340 included in the histogram 350. In one embodiment, the weight 404 assigned to a bin 340 is the count associated with the bin 340. Hence, referring the histogram 350 of FIG. 3D, the fingerprint generator 130 would assign 404 a weight w=23 for the bin 340 identified as "A", would assign 404 a weight w=15 for the bin 340 identified as "B", and so on until each bin 340 of the histogram 350 has been assigned 404 a weight. The weight assigned 404 to a bin 340 can also be a transform of the associated count (e.g., a square root of the count). The assigned 404 weight can also be constrained between a minimum value and a maximum value to limit the influence of any individual bin 340.

The fingerprint generator 130 applies 406 the selected 402 hash function to each bin 340 in a weighted manner. The data from a bin 340 that is input to the applied 406 hash function comprises a sequence of bits representative of the bin 340. For example, in one embodiment, the data for a bin 340 that is input to the applied 406 hash function comprises a 64-bit sequence obtained by representing each of the partition 320, the subfingerprint position and the min-hash value associated with the bin 340 as a number and then applying a hash (e.g., Jenkins hash) to the three numbers to generate a 64-bit sequence. In another embodiment, the bin 340 is treated as a string of ASCII characters (e.g., the ASCII characters corresponding to "partition 1, subfingerprint position 4, minhash value 10"), with the hash function applied 406 to the string. Also, data for the bin 340 can serve to initialize a random number generator, such as a linear congruential generator, and the output of the random number generator can comprise a sequence of bits to which the hash function is applied 406.

In one embodiment, applying 406 the hash function to a bin 340 in a weighted manner comprises applying 406 the hash function with a constant seed value to w versions of the bin 340. For example, the fingerprint generator 130 can apply 406 the selected 402 hash function to 23 versions of bin A, can apply 406 the selected 402 hash function to 15 versions of bin B, and so on until the hash function has been applied 406 to one or more versions of each bin 340 of the histogram 350, the number of versions for a bin 340 equal to the assigned 404 weight w. In one embodiment, a first version of a bin 340 is a first permutation of the data included in the bin 340, a second version of the bin 340 is a second permutation of the data included in the bin 340, and so on. The concept of permutations (bit-swaps) and their application was described above in reference to FIGS. 2C and 2D. In another embodiment, a first version of a bin 340 is created by appending an entry of "1" to the data included in the bin 340, a second version of the bin 340 is created by appending an entry of "2" to the data included in the bin 340, and so on.

After applying 406 the selected 402 hash function in a weighted manner, the fingerprint generator 130 determines 408 which input to the hash function resulted in the smallest output and populates 410 the fingerprint with the determined 408 hash input. The fingerprint generator 130 then repeats the applying 406, determining 408, and populating 410 steps for a number s of different seeds for the selected 402 hash function. Once the fingerprint is fully populated 412, the fingerprint generator 130 stores the created fingerprint in the fingerprint database 155.

Figure 4B:
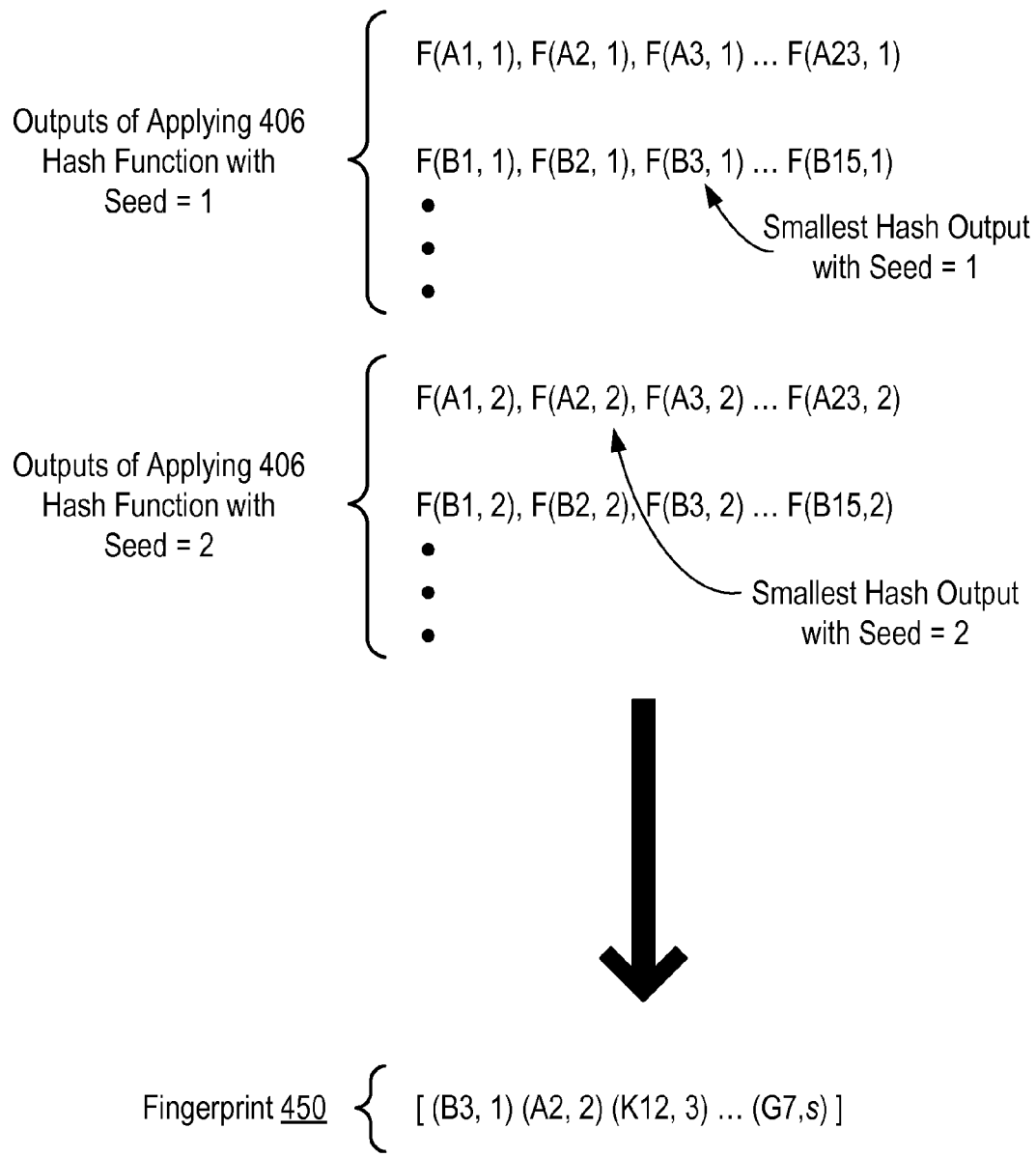
FIG. 4B illustrates aspects of one embodiment of a method for generating a full-length fingerprint for a video from a master histogram for the video.

FIG. 4B illustrates aspects of the weighted min-hash procedure 400 depicted in FIG. 4A as applied to the example histogram 350 of FIG. 3D and includes an example fingerprint 450. In FIG. 4B, "F(A1, 1)" indicates the output of the selected 402 hash function for inputs "A1" and "1" wherein A1 is a first version of bin 340 A and "1" is a seed value, "F(A2, 1)" indicates the output of the selected 402 hash function for inputs "A2" and "1" wherein A2 is a second version of bin 340 A and "1" is a seed value, and so on. The output of the applied 406 hash function comprises a single number, and in one embodiment is a 32-bit number.

As shown in FIG. 4B, applying 406 the selected 402 hash function to w versions of each bin 340 of the histogram 350 can result in a very large number of hash outputs. For example, there are 23 hash outputs for bin A, 15 hash outputs for bin B, and so on for each of the s seeds. For visual clarity, a few hash outputs are illustrated in FIG. 4B, but as indicated by the ellipsis and vertical dots, applying 406 the selected 402 hash function to w versions of each bin 340 of the histogram 350 can result in many more hash outputs.

As previously described, the fingerprint generator 130 determines 408 which hash input resulted in the smallest hash output and populates the fingerprint 450 with that determined 408 hash input. In FIG. 4B for example, a case is illustrated in which applying 406 the selected 402 hash function in a weighted manner with a constant seed of 1 yielded the smallest hash output when the other input was the third version of bin 340 B. Hence, the first entry of the fingerprint 450 encodes the tuple (B3, 1). In the case illustrated by FIG. 4B, applying 406 the selected 402 hash function in a weighted manner with a constant seed of 2 yielded the smallest hash output when the other input was the second version of bin 340 A, the second entry of the fingerprint 450 therefore encodes the tuple (A2, 2). Ultimately, the fingerprint generator 130 repeats the applying 406, determining 408, and populating steps 410 s times with s different seeds. The full-length fingerprint 450 for the video 202 is therefore a vector comprising s entries wherein each entry encodes which version of which bin 340 resulted in the smallest hash function output for the corresponding seed. In one embodiment, s is eighty, and eight bytes is used to encode each entry, so the full-length fingerprint 450 comprises 640 bytes (eight entries at eight bytes each). Other values of s are possible, and each entry of the full-length fingerprint 450 can be encoded using a different amount of data.

Thus, in one embodiment the full-length fingerprint 450 comprises a single data element that represents features of throughout the entire duration of the video 202. Although the video 202 can comprise several tens or even hundreds of megabytes of data, the full-length video fingerprint 450 can be only tens or hundreds of bytes.

Clustering

Figures 5A, 5B:
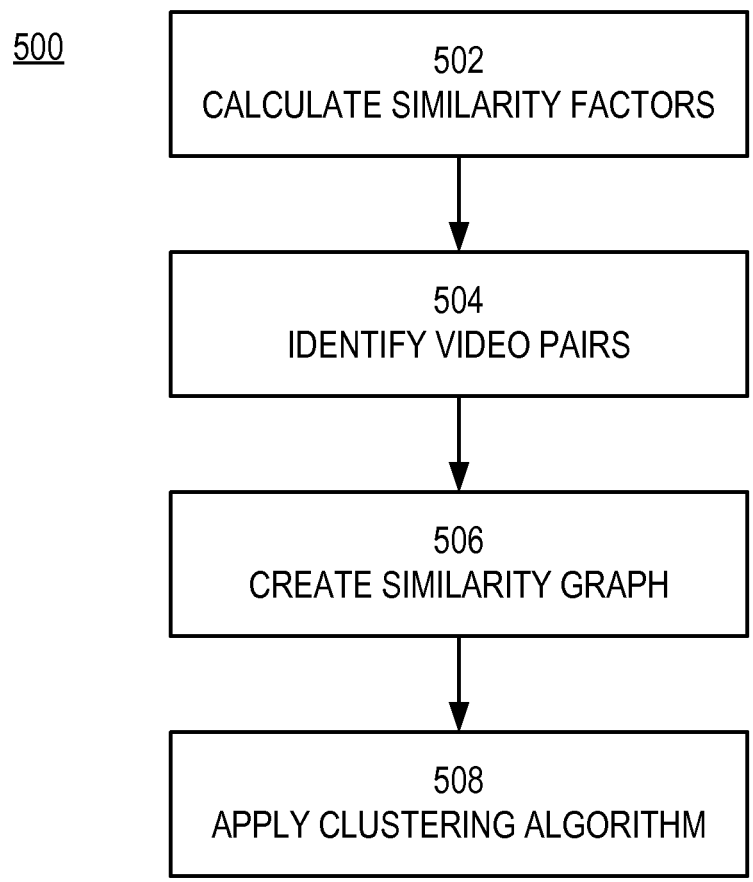
FIG. 5A illustrates one embodiment of a method for generating clusters of videos based on full-length video fingerprints for the videos.
FIG. 5B illustrates full-length video fingerprints for a video in accordance with one embodiment.

The clustering module 135 detects near-duplicate videos 202 in the video database 140 based on the corresponding full-length video fingerprints 450 stored in the fingerprint database 155. The clustering module 135 processes the full-length fingerprints 450 in the fingerprint database 155 to generate a plurality of clusters, each cluster representing a group of similar videos. FIG. 5A illustrates a flowchart of one embodiment of a clustering procedure 500 implemented by the clustering module 135. Other embodiments can perform one or more steps of the clustering procedure 500 in a different sequence. Moreover, other embodiments of the clustering procedure 500 can include additional, fewer, and/or different steps than the ones described herein.

The clustering module 135 compares full-length video fingerprints 450 for two videos 202 by calculating 502 a similarity factor for the video pair. In one embodiment, the similarity factor for a video pair is a variation of a Hamming distance metric calculated 502 based on the corresponding full-length video fingerprints 450. Each full-length video fingerprint 450 has multiple entries. The clustering module 135 evaluates two full-length video fingerprints 450 and determines a percentage of their entries that match. For example, the clustering module 135 determines how many matching entries are included in the fingerprints 450 being evaluated and divides the number of matching entries by the number of entries included in each fingerprint 450.

To help further explain calculation 502 of a similarity factor, FIG. 5B illustrates an example of a first full-length video fingerprint 450a and an example of a second full-length video fingerprint 450b. The first fingerprint 450a and the second fingerprint 450b both comprise four entries. The second and third entries in the two fingerprints 450a, 450b are equivalent. Thus, there are two matches for the fingerprints 450a, 450b. The clustering module 135 can therefore calculate 502 a similarity factor for the two fingerprints 450a, 450b of 0.50, 50%, or some other equivalent.

After calculating 502 similarity factors for all pairs of videos 202 stored in the video database 140 based on the corresponding full-length video fingerprints 450 stored in the fingerprint database 155, the clustering module 135 identifies 504 those video pairs having a similarity factor above a threshold. In one embodiment, the clustering module 135 employs a locality-sensitive hashing (LSH) algorithm to identify 504 the sufficiently similar videos. Other conventional matching techniques suitable for identifying 504 similar items within large quantities of data to, such as nearest neighbor search techniques based on kd-trees or spill trees, can also be utilized by the clustering module 135.

Based on the identified 504 video pairs, the clustering module 135 creates 506 a similarity graph comprising nodes corresponding to videos 202 and edges between the nodes that signify a similarity between the connected videos 202. In one embodiment, all edges have equal significance, and the presence of an edge between two videos 202 simply indicates that the calculated 502 similarity factor for the two videos 202 exceeded the threshold. The clustering module 135 can also create 506 a similarity graph comprising edges between pairs of videos 202 whose similarity factor does not exceed the threshold. For example, if video A is sufficiently similar to video B, and video B is sufficiently similar to video C, and edge can be included between video A and video C even if their calculated 502 similarity factor is below the threshold. Edges within the created 506 graph can also be weighted based on the corresponding similarity factor (e.g., the weight of an edge is proportion to the corresponding similarity factor).

The clustering module 135 then applies 508 a clustering algorithm to the videos 202. In one embodiment, the clustering module 135 applies a leader clustering algorithm. Leader clustering comprises arranging the videos 202 in a sequence, the sequence based on any suitable attribute (e.g., alphabetical by title, sequential by date and time of upload, sequential by duration, etc.). Once the videos 202 are arranged, the first video 202 is placed into a first cluster with all videos 202 to which the first video 202 is sufficiently similar. The videos 202 included in the first cluster are removed from the sequence. This process of assigning videos 202 to clusters is repeated until the sequence is empty. In one embodiment, the clustering module 135 assigns a unique cluster ID to each generated cluster Once the set of clusters has been generated by the clustering module 135, each video 202 ingested by the video hosting service 100 can be analyzed to see if it corresponds to one of the previously generated clusters by generating a full-length fingerprint 450 for the ingested video 202 as described above and comparing the fingerprint 450 to previously generated fingerprints 450. The clustering module 135 can then append or modify metadata associated with the video 202 to indicate if it is a near-duplicate video and, if so, identify which other videos 202 for which it is a near duplicate. For example, the clustering module 135 can modify the metadata to include a cluster ID associated with one of the previously generated clusters.

As previously described, such metadata can help the video hosting service 100, for example, provide improved searching and browsing capabilities (e.g., by not presenting to the user an excessive number of near-duplicate results in response to a query), propagate metadata among videos 202, or identify videos 202 as suitable for various management policies (e.g., videos 202 suitable for monetization via a particular advertisement or subscription policy, videos 202 which should be eliminated from the database, etc.).

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating full-length video fingerprints through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating a full-length fingerprint of a video, the method executed by at least one computer system, the method comprising:
   accessing a plurality of subfingerprints for the video, wherein each subfingerprint encodes features of a corresponding segment of the video;
   generating a plurality of subhistograms, wherein each subhistogram encodes a frequency of a subfingerprint feature for a subset of the plurality of subfingerprints;
   concatenating the plurality of subhistograms to generate a histogram, wherein the histogram encodes a frequency of the subfingerprint feature for the plurality of subfingerprints;
   generating the full-length video fingerprint based on the histogram; and
   storing the full-length video fingerprint to memory.

2. The method of claim 1, wherein each subfingerprint comprises a vector of min-hash values.

3. The method of claim 2, further comprising:
   applying a wavelet transform to a segment of the video to create an array of wavelet coefficients; and
   applying a min-hash procedure to the array of wavelet coefficients to create the subfingerprint corresponding to the segment of the video.

4. The method of claim 1, wherein generating the plurality of subhistograms comprises:
   dividing the plurality of subfingerprints into a plurality of partitions, wherein each partition comprises a subset of the plurality of subfingerprints;
   determining a number of subfingerprints in each partition that includes the subfingerprint feature in a subfingerprint position.

5. The method of claim 1, wherein each subhistogram comprises a multi-dimensional vector with dimensions comprising:
   a subfingerprint position dimension;
   a min-hash value dimension; and
   a number of occurrences dimension.

6. The method of claim 1, wherein generating the histogram further comprises:
   generating a plurality of bins, each bin specifying a subhistogram feature;
   associating each generated bin with a count; and
   populating the histogram, wherein the histogram comprises identifiers of the generated bins in association with the corresponding counts.

7. The method of claim 1, wherein generating the full-length video fingerprint based on the histogram comprises:
   applying a hashing procedure to the histogram to generate the full-length video fingerprint.

8. The method of claim 7, wherein applying a hashing procedure to the histogram to generate the full-length video fingerprint comprises:
   assigning a weight to each of a plurality of histogram features; and
   applying a first hash function to a number of altered versions of each histogram feature to generate a plurality of outputs for the first hash function.

9. The method of claim 8, wherein the number of altered versions of a histogram feature is based on the weight assigned to the histogram feature.

10. The method of claim 8, wherein applying a hashing procedure to the histogram to generate the full-length video fingerprint further comprises:
  determining a smallest output for the first hash function; and
  populating a first entry of the full-length video fingerprint with a first hash input, wherein the first hash input corresponds to the determined smallest output for the first hash function.

11. The method of claim 10, wherein applying a hashing procedure to the histogram to generate the full-length video fingerprint further comprises:
  applying a second hash function to the number of altered versions of each histogram feature to generate a plurality of outputs for the second hash function;
  determining a smallest output for the second hash function; and
  populating a second entry of the full-length video fingerprint with a second hash input, wherein the second hash input corresponds to the determined smallest output for the second hash function.

12. The method of claim 11, wherein the first hash function and the second hash function are part of a family of hash functions, the first hash function having a first seed value and the second hash function having a second seed value.

13. The method of claim 1, further comprising:
  assigning the video to a cluster of videos based on the generated full-length video fingerprint.

14. The method of claim 13, wherein assigning the video to a cluster of videos based on the generated full-length fingerprint comprises:
  calculating a number of matching entries for the full-length video fingerprint for the video and a second full-length video fingerprint for a second video.

15. A non-transitory computer-readable storage medium storing computer-executable code, the computer-executable code when executed by a processor causing the processor to perform a process for generating a full-length fingerprint of a video, the process comprising:
  accessing a plurality of subfingerprints for the video, wherein each subfingerprint encodes features of a corresponding segment of the video;
  generating a plurality of subhistograms, wherein each subhistogram encodes a frequency of a subfingerprint feature for a subset of the plurality of subfingerprints;
  concatenating the plurality of subhistograms to generate a histogram, wherein the histogram encodes a frequency of the subfingerprint feature for the plurality of subfingerprints;
  generating the full-length video fingerprint based on the histogram; and
  storing the full-length video fingerprint to memory.

16. The non-transitory computer-readable storage medium of claim 15, wherein each subfingerprint comprises a vector of min-hash values.

17. The non-transitory computer-readable storage medium of claim 16, the process further comprising:
  applying a wavelet transform to a segment of the video to create an array of wavelet coefficients; and
  applying a min-hash procedure to the array of wavelet coefficients to create the subfingerprint corresponding to the segment of the video.

18. The non-transitory computer-readable storage medium of claim 15, wherein generating the plurality of subhistograms comprises:
  dividing the plurality of subfingerprints into a plurality of partitions, wherein each partition comprises a subset of the plurality of subfingerprints;
  determining a number of subfingerprints in each partition that includes the subfingerprint feature in a subfingerprint position.

19. The non-transitory computer-readable storage medium of claim 15, wherein each subhistogram comprises a multi-dimensional vector with dimensions comprising:
  a subfingerprint position dimension;
  a min-hash value dimension; and
  a number of occurrences dimension.

20. The non-transitory computer-readable storage medium of claim 15, wherein generating the histogram further comprises:
  generating a plurality of bins, each bin specifying a subhistogram feature;
  associating each generated bin with a count; and
  populating the histogram, wherein the histogram comprises identifiers of the generated bins in association with the corresponding counts.

21. The non-transitory computer-readable storage medium of claim 15, wherein generating the full-length video fingerprint based on the histogram comprises:
  applying a hashing procedure to the histogram to generate the full-length video fingerprint.

22. The non-transitory computer-readable storage medium of claim 21, wherein applying a hashing procedure to the histogram to generate the full-length video fingerprint comprises:
  assigning a weight to each of a plurality of histogram features; and
  applying a first hash function to a number of altered versions of each subhistogram feature to generate a plurality of outputs for the first hash function.

23. The non-transitory computer-readable storage medium of claim 22, wherein the number of altered versions of a subhistogram feature is based on the weight assigned to the subhistogram feature.

24. The non-transitory computer-readable storage medium of claim 22, wherein applying a hashing procedure to the master histogram to generate the full-length video fingerprint further comprises:
  determining a smallest output for the first hash function; and
  populating a first entry of the full-length video fingerprint with a first hash input, wherein the first hash input corresponds to the determined smallest output for the first hash function.

25. The non-transitory computer-readable storage medium of claim 24, wherein applying a hashing procedure to the master histogram to generate the full-length video fingerprint further comprises:
  applying a second hash function to the number of altered versions of each subhistogram feature to generate a plurality of outputs for the second hash function;
  determining a smallest output for the second hash function; and
  populating a second entry of the full-length video fingerprint with a second hash input, wherein the second hash input corresponds to the determined smallest output for the second hash function.

26. The non-transitory computer-readable storage medium of claim 25, wherein the first hash function and the second hash function are part of a family of hash functions, the first hash function having a first seed value and the second hash function having a second seed value.

27. The non-transitory computer-readable storage medium of claim 15, the process further comprising:
  assigning the video to a cluster of videos based on the generated full-length video fingerprint.

28. The non-transitory computer-readable storage medium of claim 27, wherein assigning the video to a cluster of videos based on the generated full-length fingerprint comprises:
  calculating a number of matching entries for the full-length video fingerprint for the video and a second full-length video fingerprint for a second video.

\* \* \* \* \*